United States Patent Office 2,749,741
Patented June 12, 1956

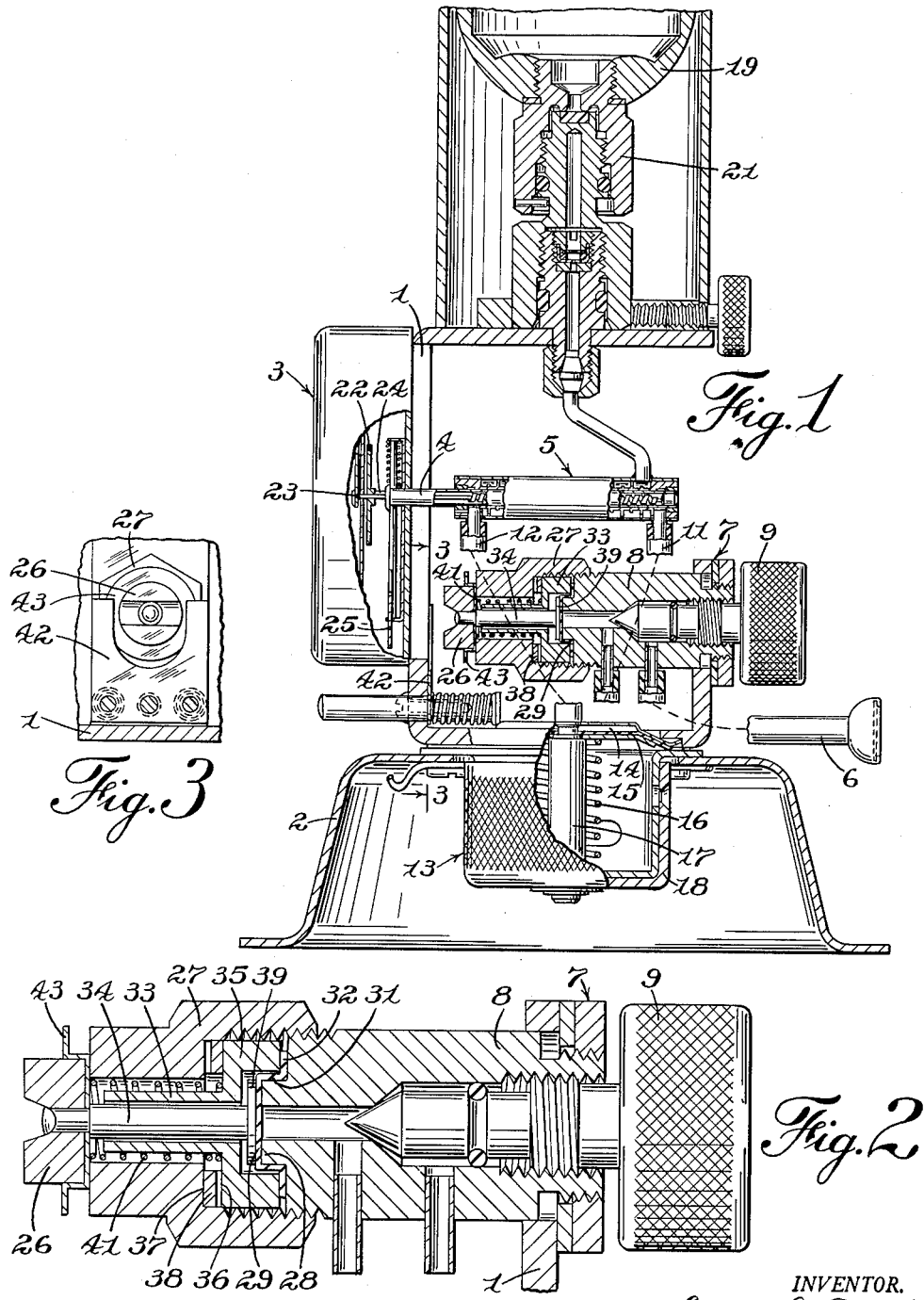

2,749,741

FREEZING POINT METER

Larry L. Gerwig, Elmira Heights, N. Y., assignor to Bendix Aviation Corporation, a corporation of Delaware Application October 26, 1953, Serial No. 388,300

2 Claims. (Cl. 73—17)

The present invention relates to a freezing point meter and more particularly to a device for freezing a test sample of an arctic coolant for internal combustion engines, and recording the temperature at which the sample melts.

The present invention is in the nature of an improvement of the thermometer arresting means illustrated in the applications of Dickey Ser. No. 290,924 filed May 31, 1952, now Patent No. 2,688,247 and of Hood Ser. No. 370,381 filed July 27, 1953, assigned to the assignee of the present invention.

It is an object of the present invention to provide a novel freezing point meter which is convenient and accurate in operation and easily adjusted, and which retains its calibration and uniformity of operation over extended periods of use.

Further objects and advantages will be apparent from the following description taken in connection with the accompanying drawing in which:

Fig. 1 is a side elevation, partly broken away and in section of a preferred embodiment of the invention;

Fig. 2 is an enlarged sectional detail of the magnetic arresting means for the thermometer; and Fig. 3 is a sectional detail taken substantially on the line 3—3 of Fig. 1.

In Fig. 1 of the drawing there is illustrated a freezing point meter comprising a frame 1 mounted on a pedestal 2 and carrying a thermometer 3, on the stem 4 of which is mounted a sample holder and heat exchanger device indicated generally by numeral 5.

Means for drawing a sample of the liquid to be tested into and through the sample holder 5 is provided comprising an inlet tube 6 which is attached to a fitting 7 comprising a nipple 8 and a manually operable valve 9. A tube 11 connects the nipple 8 to one end of the sample holder 5, the opposite end being connected by a tube 12 to a suction and pressure device 13. This device comprises a chamber 14 closed by a flexible diaphragm 15 which is normally subjected to the pressure of a spring 16 but which may be withdrawn by a stem 17 actuated by rotation of a sleeve 18 having an inclined pin and slot connection with the frame 1.

Means for cooling the sample holder and heat exchanger 5 to freeze the sample therein is provided including a flask 19 containing carbon dioxide or other suitable liquid under pressure, and valve means 21 for releasing the freezing medium and conducting it around the heat exchanger.

In the operation of the structure as so far described, a sample of the liquid to be tested is drawn through the sample holder 5 by manipulation of the sleeve 18, the valve 9 is closed and the sample is then frozen solid. Thereafter the sleeve 18 is released so as to permit the spring 16 to apply pressure on the diaphragm 15 tending to eject the sample. The sample is then permitted to thaw, and the temperature at which it starts to flow under the pressure of the spring 16 is noted and recorded.

This invention is directed more particularly to an improved form of magnetic arresting means for retaining the critical reading of the thermometer. For this purpose, a disc 22 is rigidly mounted on the needle staff 23 of the thermometer and a pawl 24 is arranged to be moved into engagement with the disc when an armature 25 is attracted by a permanent magnet 26.

In order to move the magnet 26 into operative relation to the armature 25, the end of the nipple 8 is threaded for the reception of an internally threaded sleeve 27 of magnetic material which acts as a keeper for the magnet. The nipple 8 has a cylindrical extension 28 of reduced diameter, and a flexible diaphragm 29 having an intermediate cylindrical portion 31 is loosely seated on the extension 28 of the nipple. Diaphragm 29 has a flange portion 32 clamped against the end of the nipple whereby the diaphragm acts as a closure for the nipple.

A sealing and bearing member 33 is mounted in the keeper sleeve 27 and serves as a bearing for a shaft 34 which is slidably mounted therein and has the magnet 26 rigidly mounted on its projecting end. The member 33 has a portion 35 of enlarged diameter fitting loosely over the cylindrical portion 31 of diaphragm 29 and seated against the peripheral flange 32 of the diaphragm. The sealing member 33 and keeper sleeve 27 are formed with spaced shoulders 36 and 37 respectively, between which an annular compression spring 38 is located for maintaining clamping pressure on the sealing member irrespective of longitudinal adjustment of the keeper sleeve 27 on the nipple 8. Spring 38 also serves as a locking means for retaining the adjustment of the keeper sleeve.

A thrust disc 39 occupies the space between the diaphragm 29 and the adjacent end of the shaft 34 when the magnet 26 is in retracted position, and transmits to said shaft the expansive movement of the diaphragm 29 responsive to hydraulic pressure in the nipple 8. A spring 41 located within the keeper sleeve 27 urges the magnet 26 toward operative position, but is normally ineffective to initiate such movement due to the attraction between the magnet and the keeper sleeve 27.

Means for returning the magnet 26 to retracted position after having been released is provided in the form of a manually operable fork member 42 slidably mounted in the frame 1 in position to engage a flange member 43 of non-magnetic material rigidly connected to the magnet 26.

The keeper sleeve 27 is adjusted on the nipple 8 to such a position that a slight movement of the magnet 26 away from the keeper responsive to expansion of the diaphragm 29 will enable the spring 41 to overcome the attraction of the keeper and move the magnet into effective relation with the pawl-actuating armature 25.

In the operation of the arresting means, when the sample in the holder 5 starts to melt, since the valve 9 is closed as above stated, the pressure on the sample exerted by the spring 16 becomes effective within the nipple 8 to expand the diaphragm 29 which imparts a slight movement to magnet 26 away from the keeper 27. The mutual attraction between the magnet and keeper is thus reduced sufficiently to permit the spring 41 to project the magnet into proximity with the armaure 25 whereby the pawl 24 is actuated to arrest the needle staff of the thermometer and thus record the melting point of the sample.

Although but one embodiment of the invention has been shown and described in detail, it will be understood that other embodiments are possible and that changes may be made in the precise form and arrangement of the parts without departing from the spirit of the invention.

I claim:

1. In a freezing point tester for arctic coolants for internal combustion engines, a mechanical thermometer, and means responsive to hydraulic pressure for arresting the thermometer including a movable armature, a magnet for actuating the armature, a threaded nipple fixedly mounted in spaced relation to the armature having a central opening, an elastic diaphragm, a sealing and bearing member engaging the periphery of the diaphragm, a shaft slidably supported in the bearing member extending into proximity to the diaphragm, having said magnet fixedly mounted on its projecting end, a spring operative to urge the magnet away from the nipple toward said armature, and means including a combined keeper and clamping sleeve of magnetic material adjustably threaded on the nipple for clamping the sealing member and diaphragm against the end of the nipple and for normally holding the magnet in retracted position; in which the clamping member and the sealing member are provided with spaced shoulders, and including further an annular compression spring in said space effective to maintain sealing pressure on the sealing member irrespective of adjustment of the clamping and keeper member to vary its retaining effect on the magnet, and to maintain said adjustment.

2. Arresting means for a freezing point tester as set forth in claim 1 in which said nipple has a cylindrical extension of reduced diameter, and the diaphragm is formed with a cylindrical portion loosely surrounding said extension, and including further a rigid disc of substantially the same diameter as said extension, occupying the space between the diaphragm and the magnet-supporting shaft.

References Cited in the file of this patent

UNITED STATES PATENTS 2,635,458     Dickey et al. _____ Apr. 21, 1953